(12) United States Patent
Fishman et al.

(10) Patent No.: US 7,286,763 B2
(45) Date of Patent: Oct. 23, 2007

(54) OPTICAL ADD/DROP MULTIPLEXER HAVING A BANDED CHANNEL CONFIGURATION

(75) Inventors: Daniel A. Fishman, Lakewood, NJ (US); Xiang Liu, Marlboro, NJ (US); Vincent John Silverio, Middletown, NJ (US); William A. Thompson, Red Bank, NJ (US); Jinpin Ying, East Brunswick, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 554 days.

(21) Appl. No.: 10/869,663

(22) Filed: Jun. 16, 2004

(65) Prior Publication Data

US 2005/0281557 A1    Dec. 22, 2005

(51) Int. Cl.
*H04J 14/02* (2006.01)
(52) U.S. Cl. ............... 398/82; 398/83; 398/84; 398/85; 398/41; 398/43; 398/48; 398/49; 398/68; 385/24; 385/31
(58) Field of Classification Search ............ 398/37–85, 398/115–128; 359/290
See application file for complete search history.

(56) References Cited

U.S. PATENT DOCUMENTS

| | | | |
|---|---|---|---|
| 6,097,516 A | 8/2000 | Almström et al. | 359/119 |
| 6,208,443 B1 | 3/2001 | Liu et al. | 359/127 |
| 6,385,362 B1 | 5/2002 | Norwood | 385/14 |
| 6,404,525 B1 * | 6/2002 | Shimomura et al. | 398/82 |

(Continued)

FOREIGN PATENT DOCUMENTS

EP    1 503 532 A2    2/2005

(Continued)

OTHER PUBLICATIONS

"A Novel Interleaver with Different Output Spectrum Bandwidth," by Shao Yonghong et al., ACTA Phontonica Sinica, vol. 32, No. 8, Aug. 2003, pp. 948-950, XP009053676, Acta Photonica Sinica Aug. 2003 Science Press China.

(Continued)

*Primary Examiner*—Kenneth Vanderpuye
*Assistant Examiner*—Li Liu

(57) ABSTRACT

An optical add/drop multiplexer (OADM) adapted to route optical signals having at least two different bit rates. The OADM has at least two sets of DWDM channels, e.g., with channels in a first set having a first bandwidth value suitable for the transmission of 10-Gb/s signals and channels in a second set having a second bandwidth value suitable for the transmission of 40-Gb/s signals. The first and second sets occupy two different spectral bands and the first set has two subsets of interleaved channels. In one embodiment, the OADM has first and second optical branches adapted to process optical signals corresponding to first and second groups of channels, respectively. The first group includes a first subset from the first set while the second group includes the second set and a second subset from the first set. Advantageously, OADMs of the invention may be used to create independent processing paths for different groups of channels. As a result, a communication system having those OADMs can be upgraded, e.g., to add a new 40-Gb/s service and/or to populate additional 10-Gb/s channels substantially without interrupting the 10-Gb/s service already in place.

34 Claims, 13 Drawing Sheets

U.S. PATENT DOCUMENTS

| | | |
|---|---|---|
| 6,535,309 B1 | 3/2003 | Terahara .................... 359/124 |
| 6,560,380 B2 | 5/2003 | Huang et al. ................. 385/15 |
| 6,591,038 B1 | 7/2003 | Pezeshki ..................... 385/37 |
| 6,597,842 B2 | 7/2003 | Dent et al. ................... 385/39 |
| 6,631,246 B2 | 10/2003 | Ford et al. ................. 398/158 |
| 6,643,064 B2 | 11/2003 | Huang et al. ............... 359/497 |
| 6,842,562 B2 * | 1/2005 | Kinoshita et al. ............ 385/24 |
| 6,920,277 B2 | 7/2005 | Young |
| 2001/0040710 A1 | 11/2001 | Sharatt et al. |
| 2002/0149818 A1 | 10/2002 | Tomofuji et al. ........... 359/124 |
| 2002/0196493 A1 | 12/2002 | Marom ...................... 359/127 |
| 2002/0196520 A1 | 12/2002 | Marom et al. |
| 2003/0090762 A1 | 5/2003 | MaGuire, Jr. |
| 2003/0091273 A1 | 5/2003 | Rodriguez-Llorente ...... 385/24 |
| 2003/0175029 A1 * | 9/2003 | Harney et al. ................ 398/83 |
| 2003/0215233 A1 * | 11/2003 | Tomofuji et al. ............. 398/41 |
| 2004/0004756 A1 * | 1/2004 | Hainberger et al. ...... 359/341.3 |
| 2004/0202473 A1 * | 10/2004 | Nakamura et al. ........... 398/85 |

FOREIGN PATENT DOCUMENTS

EP     1 508 987 A2     2/2005

OTHER PUBLICATIONS

"Study of 10G/40G Hybrid Ultra Long Haul Transmission Systems with Reconfigurable OADMs for Efficient Wavelength Usage," by Ito et al., Proc. ECOC 2002, Copenhagen, Denmark 2002, Paper 1.1.4.

* cited by examiner

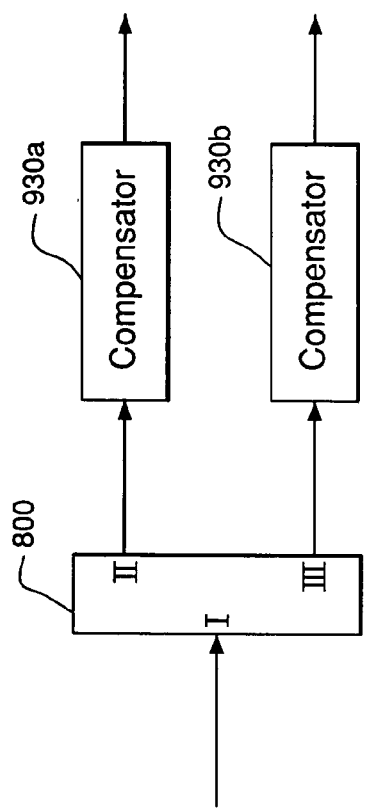
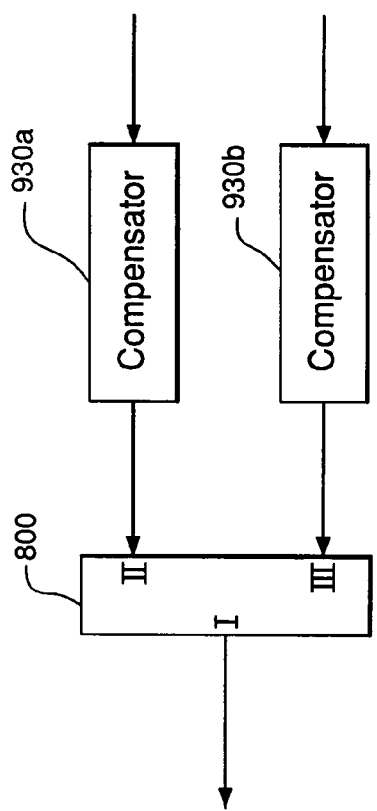
FIG. 9A
FIG. 9B

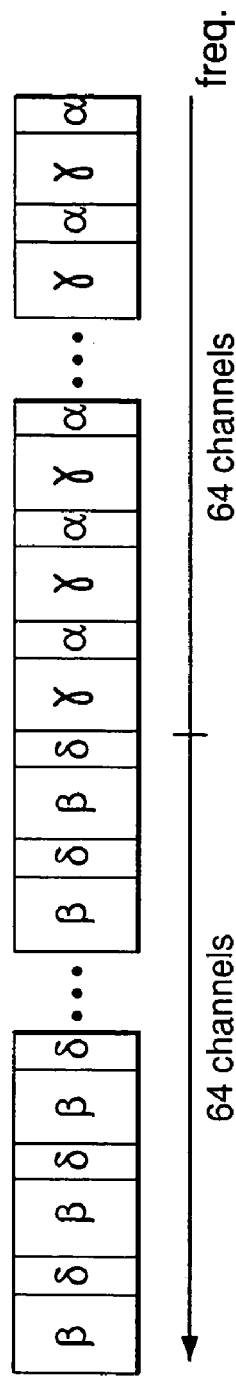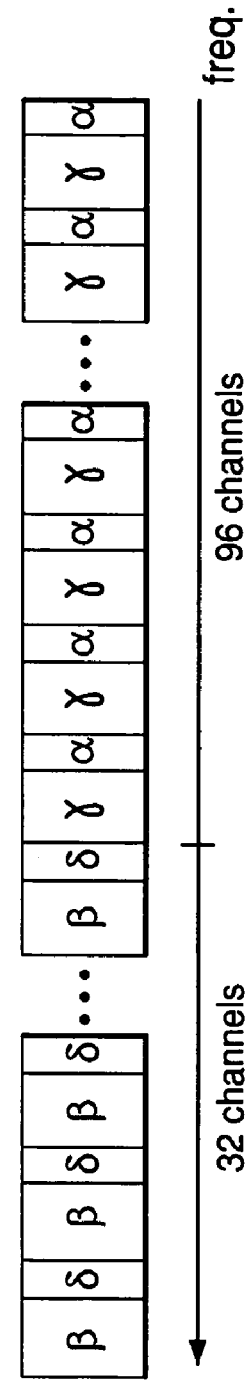
FIG. 10A
FIG. 10B

OPTICAL ADD/DROP MULTIPLEXER HAVING A BANDED CHANNEL CONFIGURATION

CROSS-REFERENCE TO RELATED APPLICATIONS

This application is one of a set of U.S. patent applications consisting of Ser. No. 10/869,431 and Ser. No. 10/869,663 both of which were filed on the same date and the teachings of both of which are incorporated herein by reference.

BACKGROUND OF THE INVENTION

1. Field of the Invention

The present invention relates to optical communication equipment and, more specifically, to optical add/drop multiplexers.

2. Description of the Related Art

Modern optical communication systems, e.g., long-haul and metro networks, employ dense wavelength division multiplexed (DWDM) channels adapted to carry optical signals having a bit rate of 10 Gb/s. It is envisioned that future optical communication systems will employ DWDM channels adapted to carry signals having a bit rate of 40 Gb/s. 40-Gb/s optical signals, based on conventional and/or advanced modulation formats, are likely to be used together with 10-Gb/s optical signals and/or gradually displace the latter. It is therefore desirable to have a communication platform that supports both 10- and 40-Gb/s optical signals and enables reconfiguration of the optical communication system, e.g., when a 40-Gb/s upgrade becomes available, without or with minimum interruptions to the 10-Gb/s service already in place.

SUMMARY OF THE INVENTION

Problems in the prior art are addressed, in accordance with the principles of the present invention, by an optical add/drop multiplexer (OADM) adapted to route optical signals having at least two different bit rates. The OADM has at least two sets of DWDM channels, e.g., with channels in a first set having a first bandwidth value suitable for the transmission of 10-Gb/s signals and channels in a second set having a second bandwidth value suitable for the transmission of 40-Gb/s signals. The first and second sets occupy two different spectral bands and the first set has two subsets of interleaved channels. In one embodiment, the OADM has first and second optical branches adapted to process optical signals corresponding to first and second groups of channels, respectively. The first group includes a first subset from the first set while the second group includes the second set and a second subset from the first set. Advantageously, OADMs of the invention may be used to create independent processing paths for different groups of channels. As a result, a communication system having those OADMs can be upgraded, e.g., to add a new 40-Gb/s service and/or to populate additional 10-Gb/s channels substantially without interrupting the 10-Gb/s service already in place.

According to one embodiment, the present invention is an optical apparatus, comprising a plurality of ports having first, second, and third ports, which apparatus is adapted to route optical signals between different ports based on wavelength, wherein: the optical signals correspond to two or more sets of channels, each set having one or more channels with a corresponding bandwidth value; at least two different sets of channels have different bandwidth values; and the optical apparatus comprises a routing device adapted to: route optical signals corresponding to a first group of channels between the first port and the second port; and route optical signals corresponding to a second group of channels between the first port and the third port.

According to another embodiment, the present invention is a method of transmitting optical signals, comprising: routing optical signals corresponding to a first group of channels between a first port and a second port of an optical routing device; and routing optical signals corresponding to a second group of channels between the first port and a third port of said optical routing device, wherein: the optical signals correspond to two or more sets of channels, each set having one or more channels with a corresponding bandwidth value; and at least two different sets of channels have different bandwidth values.

According to yet another embodiment, the present invention is an apparatus, comprising: means for routing optical signals corresponding to a first group of channels between a first port and a second port of an optical routing device; and means for routing optical signals corresponding to a second group of channels between the first port and a third port of said optical routing device, wherein: the optical signals correspond to two or more sets of channels, each set having one or more channels with a corresponding bandwidth value; and at least two different sets of channels have different bandwidth values.

According to yet another embodiment, the present invention is a communication network, comprising a plurality of nodes adapted to exchange communication signals, wherein at least one node includes an optical apparatus having a plurality of ports including first, second, and third ports, which apparatus is adapted to route optical signals between different ports based on wavelength, wherein: the optical signals correspond to two or more sets of channels, each set having one or more channels with a corresponding bandwidth value; at least two different sets of channels have different bandwidth values; and the optical apparatus comprises a routing device adapted to: route optical signals corresponding to a first group of channels between the first port and the second port; and route optical signals corresponding to a second group of channels between the first port and the third port.

BRIEF DESCRIPTION OF THE DRAWINGS

Other aspects, features, and benefits of the present invention will become more fully apparent from the following detailed description, the appended claims, and the accompanying drawings in which:

FIGS. 9A-B show block diagrams of a DMUX and a MUX, respectively, which can be used in the OADMs of FIGS. 3 and 5;

FIGS. 10A-B graphically illustrate channel-population schemes for the DWDM channel configuration of FIG. 7;

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
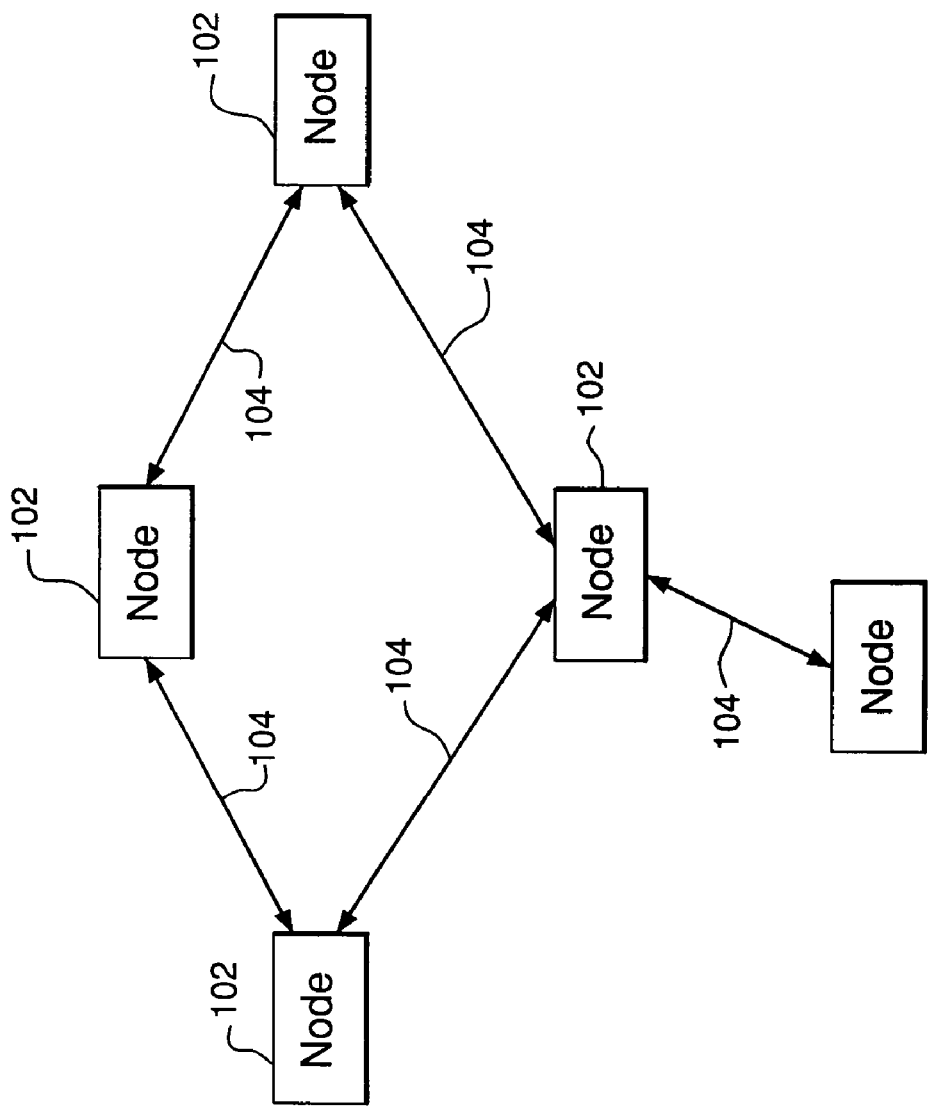
FIG. 1 shows a block diagram of an optical communication system, in which the present invention can be practiced.

FIG. 1 shows a block diagram of an optical communication system 100, in which the present invention can be practiced. System 100 has a network of nodes 102 coupled by bi-directional links 104, where each of the nodes is adapted to process optical signals carried via the links. Signal processing at each node 102 includes, but is not limited to, routing optical signals between adjacent nodes, extracting (i.e., dropping) from the network traffic optical signals designated for local receivers, and inserting (i.e., adding) into the network traffic optical signals generated by local transmitters. Each link 104 may include one or more optical fibers, optical amplifiers (not shown), signal regenerators (not shown), and other customary components.

Figure 2:
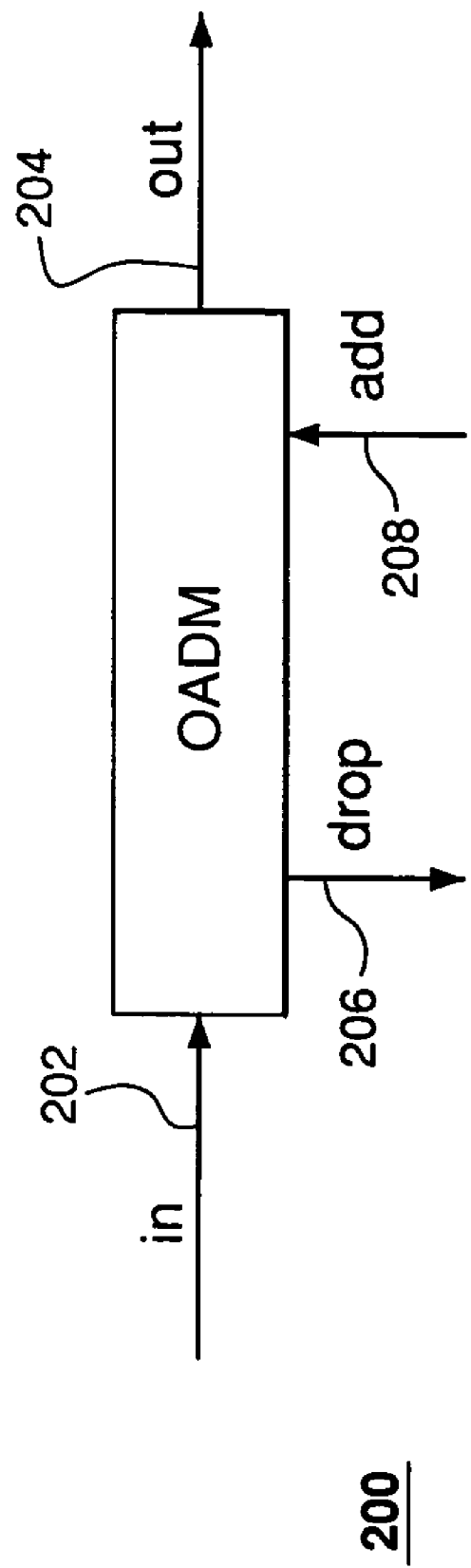
FIG. 2 shows an optical add/drop multiplexer (OADM) that can be used in a node of the communication system shown in FIG. 1.

FIG. 2 shows an optical add/drop multiplexer (OADM) 200 that can be used in any node 102 of system 100. OADM 200 has at least four ports including a main input port 202, a main output port 204, a drop port 206, and an add port 208. DWDM signals applied to main input port 202 are directed to either drop port 206, e.g., for distribution to local receivers, or main output port 204, e.g., for further transmission over the network of system 100. The dropped signals are typically blocked from reaching main output port 204. Some or all of the previously unused DWDM channels and/or DWDM channels corresponding to the dropped signals may then be used to transmit optical signals applied to add port 208, e.g., from local transmitters. These optical signals are multiplexed with the optical signals received at main input port 202 that are not dropped at drop port 206, and the multiplexed signal is output at main output port 204.

OADM Architecture

Figure 3:
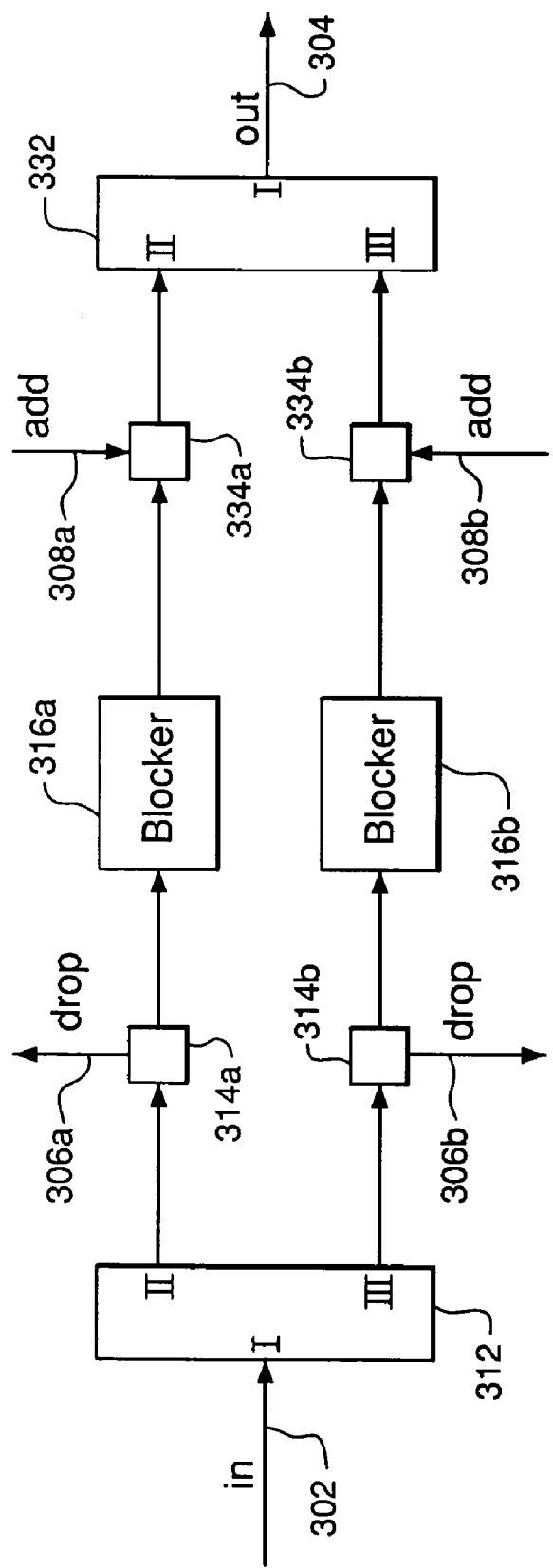
FIG. 3 shows a block diagram of an OADM that can be used to implement the OADM shown in FIG. 2.

FIG. 3 shows a block diagram of an OADM 300 that can be used to implement OADM 200 according to one embodiment of the invention. OADM 300 is a six-port device having a main input port 302, a main output port 304, two drop ports 306a-b, and two add ports 308a-b. OADM 300 operates by directing DWDM signals applied to main input port 302 to either drop ports 306a-b, e.g., for distribution to local receivers, or main output port 304, e.g., for further transmission over the network. The signals dropped at drop ports 306a-b are blocked from reaching main output port 304. Some or all of the previously unused DWDM channels and/or DWDM channels corresponding to the dropped signals may then be used to transmit optical signals applied to add ports 308a-b, e.g., from local transmitters. These optical signals are multiplexed with the optical signals received at main input port 302 that are not dropped at drop ports 306a-b, and the multiplexed signal is output at main output port 304. This functionality is realized in OADM 300 using a de-multiplexer (DMUX) 312, a multiplexer (MUX) 332, two wavelength blockers 316a-b, two splitters 314a-b, and two combiners 334a-b, each of which is described in more detail below.

DMUX 312 is a three-port device having an input port labeled I, which is coupled to main input port 302, and two output ports labeled II and III. DMUX 312 is adapted to direct the optical signals applied to port I to one of its two output ports based on wavelength or DWDM channel number. More specifically, in one embodiment, DMUX 312 directs optical signals corresponding to a first group of DWDM channels to output port II, while directing optical signals corresponding to a second group of DWDM channels to output port III. MUX 332 is a three-port device having two input ports labeled II and III and an output port labeled I, which output port is coupled to main output port 304. MUX 332 is adapted to essentially perform a reverse function of that performed by DMUX 312. More specifically, MUX 332 multiplexes the optical signals applied to its input ports and directs the multiplexed signal to the output port.

In one embodiment, each of DMUX 312 and MUX 332 is implemented using a substantially identical bi-directional optical element. More specifically, this optical element is designed to route (i) optical signals corresponding to the first group of DWDM channels between ports I and II and (ii) optical signals corresponding to the second group of DWDM channels between ports I and III. For example, when the optical element is configured as DMUX 312, an input signal is applied to port I, and two corresponding output signals emerge at ports II and III. Alternatively, when the optical element is configured as MUX 332, two input signals are applied to ports II and III, and a corresponding output signal emerges at port I.

Each of wavelength blockers 316a-b is a configurable device, which transmits optical signals intended for main output port 304 and blocks optical signals intended for the corresponding drop port 306. As such, wavelength blockers 316a-b are adapted to handle optical signals corresponding to the first and second groups of DWDM channels, respectively. Based on appropriate control signals (not shown), each of wavelength blockers 316a-b can at different times block/transmit different sub-groups belonging to the corresponding group of DWDM channels.

Each of splitters 314a-b is a passive three-port device adapted to split the signal received from DMUX 312 between the corresponding drop port 306 and wavelength blocker 316. Similarly, each of combiners 334a-b is a passive three-port device adapted to combine the signals received from the corresponding add port 308 and wavelength blocker 316 and direct the combined signal to MUX 332. In one embodiment, each of splitters 314a-b and combiners 334a-b is implemented using a substantially identical bi-directional optical element that, depending on the light-propagation direction, can operate as either a power splitter or power combiner.

Using the above-described components, OADM 300 can route an optical signal applied to main input port 302, for example, as follows. Suppose that this optical signal corresponds to the first group of DWDM channels. Then, DMUX 312 directs the signal to its output port II. Power splitter 314a then produces two signal copies and directs the first copy to drop port 306a and the second copy to wavelength blocker 316a. If the optical signal is intended to be dropped at drop port 306a, then wavelength blocker 316a is configured to block the second signal copy from propagating beyond the wavelength blocker. At the same time, a local receiver (not shown) coupled to drop port 306a receives the first signal copy, thereby accomplishing a drop function. Since the corresponding DWDM channel becomes vacant beyond wavelength blocker 316a, a local transmitter (not shown) can now apply a different optical signal corresponding to the same DWDM channel to add port 308a without causing signal interference. Power combiner 334a then combines that signal with the signals transmitted by wavelength blocker 316a and directs the combined signal to input port II of MUX 332, which routes it to main output port 304, thereby accomplishing an add function.

Alternatively, if the optical signal applied to main input port 302 is intended to be transmitted from main input port 302 to main output port 304, then wavelength blocker 316a is configured to pass the second signal copy produced by power splitter 314a. At the same time, a local receiver coupled to drop port 306a is configured to ignore the first signal copy. Since, in this situation, the corresponding DWDM channel is not vacant beyond wavelength blocker 316a, a local transmitter does not apply a different optical signal corresponding to the same DWDM channel to add port 308a to avoid signal interference.

One skilled in the art will understand that an optical signal corresponding to the second group of DWDM channels is processed in OADM 300 in a similar fashion, but using a different OADM branch, i.e., that including output port III of DMUX 312, the corresponding power splitter 314b, drop port 306b, wavelength blocker 316b, the corresponding power combiner 334b, add port 308b, and input port III of MUX 332.

Figure 4:
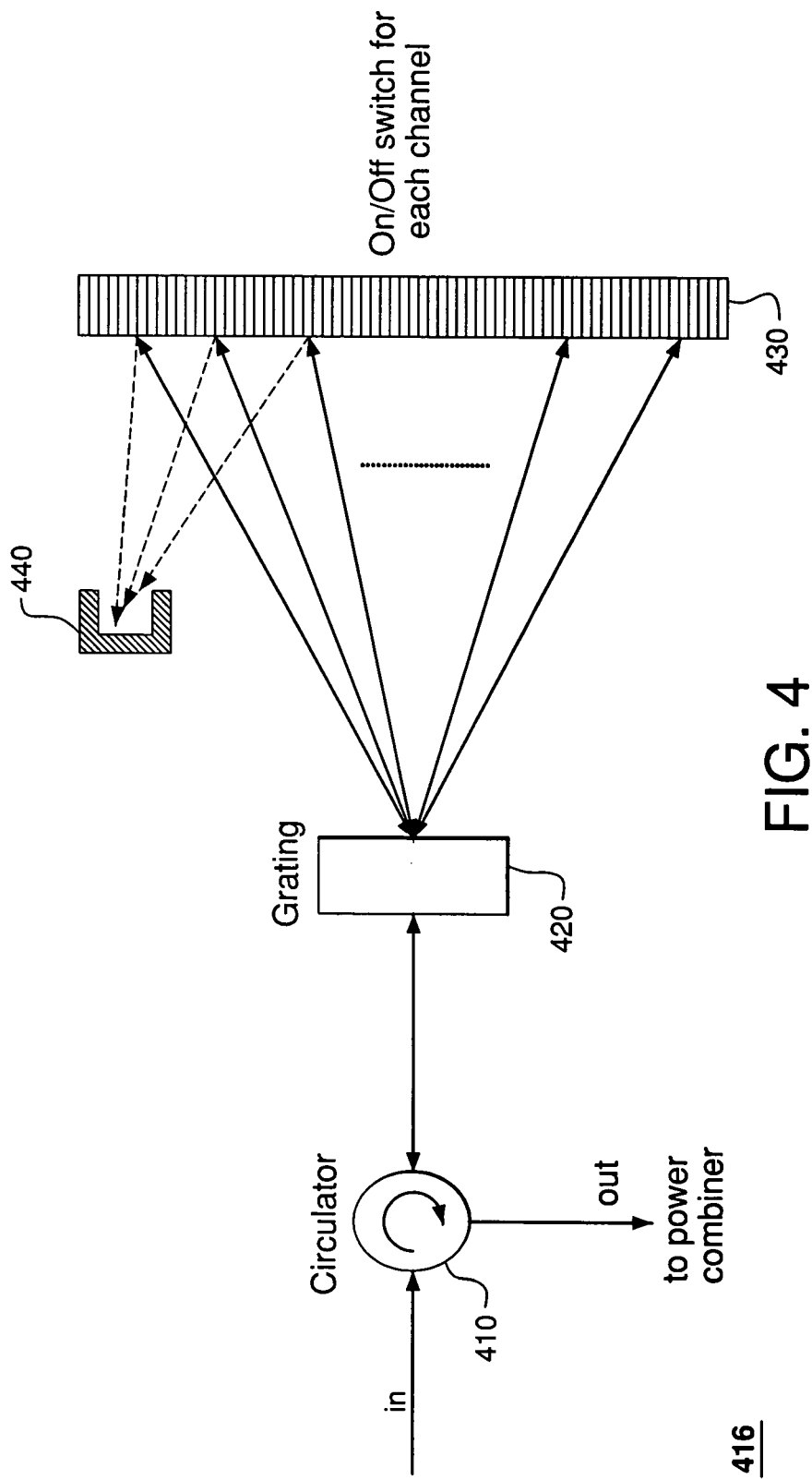
FIG. 4 shows a block diagram of a wavelength blocker that can be used in the OADM of FIG. 3.

FIG. 4 shows a block diagram of a wavelength blocker 416 that can be used as either wavelength blocker 316 of FIG. 3 according to one embodiment of the invention. Wavelength blocker 416 has a circulator 410, which directs a DWDM signal applied to the wavelength blocker, e.g., by power splitter 314 (FIG. 3), to a grating 420. Grating 420 then disperses the signal in wavelength and directs it to an on/off switch 430. In FIG. 4, the plurality of arrows between grating 420 and switch 430 represents light corresponding to different DWDM channels. Switch 430 has an array of rotatable MEMS mirrors, one mirror per DWDM channel. When an optical signal corresponding to a particular DWDM channel needs to pass through wavelength blocker 416, the corresponding mirror in switch 430 is rotated to reflect the signal back to grating 420, where it is recombined with other reflected signals and directed back to circulator 410, which outputs it from the wavelength blocker, e.g., toward power combiner 334 (FIG. 3). Alternatively, when an optical signal corresponding to a particular DWDM channel needs to be blocked in wavelength blocker 416, the corresponding mirror in switch 430 is rotated to reflect the signal toward a signal dump 440 as shown by the dashed lines in FIG. 4, where the signal is absorbed.

Figure 5:
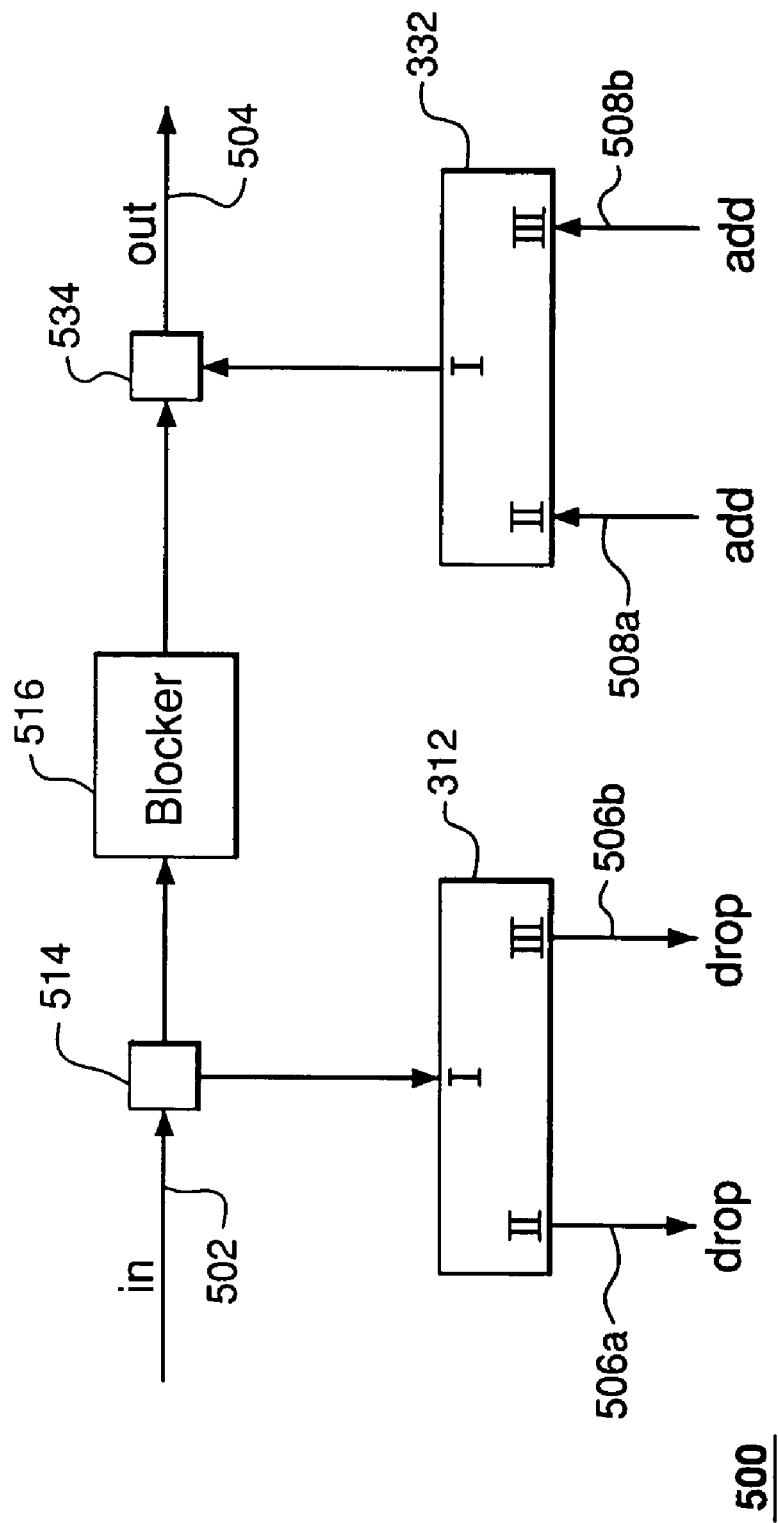
FIG. 5 shows a block diagram of another OADM that can be used to implement the OADM shown in FIG. 2.

FIG. 5 shows a block diagram of an OADM 500 that can be used to implement OADM 200 (FIG. 2) according to another embodiment of the invention. Similar to OADM 300 (FIG. 3), OADM 500 has a main input port 502, a main output port 504, two drop ports 506a-b, and two add ports 508a-b. OADM 500 operates similar to OADM 300 (FIG. 3) by directing optical signals applied to main input port 502 to either drop ports 506a-b or main output port 504. Some or all of the DWDM channels corresponding to the dropped signals and/or any unoccupied channels may be reused to transmit optical signals applied to add ports 508a-b, which are multiplexed with the optical signals received at main input port 502 that are not dropped at drop ports 506a-b. The multiplexed signal is then output at main output port 504.

Similar to OADM 300, OADM 500 has a DMUX 312 and a MUX 332. OADM 500 also employs a power splitter 514 and a power combiner 534 that are similar to power splitter 314 and a power combiner 334, respectively, of OADM 300. However, a wavelength blocker 516 employed in OADM 500 is somewhat different from either one of wavelength blockers 316a-b of OADM 300. More specifically, each of wavelength blockers 316a-b is adapted to process optical signals corresponding to only one group of DWDM channels. For example, wavelength blockers 316a and 316b process optical signals corresponding to the first and second groups of DWDM channels, respectively. In contrast, wavelength blocker 516 is adapted to process optical signals corresponding to both groups of DWDM channels.

OADM 500 can route an optical signal applied to main input port 502, for example, as follows. Power splitter 514 produces two signal copies and directs the first copy to DMUX 312 and the second copy to wavelength blocker 516. If the optical signal is intended to be dropped at one of drop ports 506a-b, then wavelength blocker 516 is configured to block the second signal copy from propagating beyond the wavelength blocker. At the same time, DMUX 312 directs the first signal copy to the corresponding one of drop ports 506a-b depending on whether the optical signal is in the first or second group of channels, and a local receiver (not shown) coupled to that drop port receives that signal copy, thereby accomplishing a drop function. Since the corresponding DWDM channel becomes vacant beyond wavelength blocker 516, a local transmitter (not shown) can now apply a different optical signal corresponding to the same DWDM channel to the appropriate one of add ports 508a-b without causing signal interference. MUX 332 then directs that signal to power combiner 534, where the signals output by the MUX and the signals transmitted by wavelength blocker 516 are combined and directed to main output port 504, thereby accomplishing an add function.

Alternatively, if the optical signal applied to main input port 502 is intended to be transmitted to main output port 504, then wavelength blocker 516 is configured to pass the second signal copy produced by power splitter 514. At the same time, the local receiver coupled to the corresponding one of drop ports 506a-b is configured to ignore the first signal copy. Since, in this situation, the corresponding DWDM channel is not vacant beyond wavelength blocker 516, a local transmitter does not apply a different optical signal corresponding to the same DWDM channel to the corresponding one of add ports 508a-b to avoid signal interference at power combiner 534.

Figure 6A:
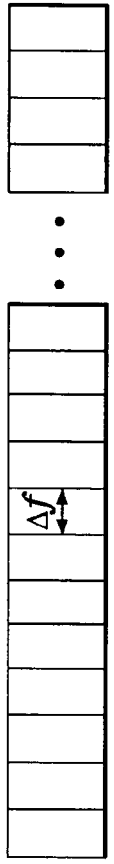
FIGS. 6A-B graphically show two representative DWDM channel configurations that can be used in certain embodiments of the OADMs shown in FIGS. 2, 3, and 5.
Figure 6B:
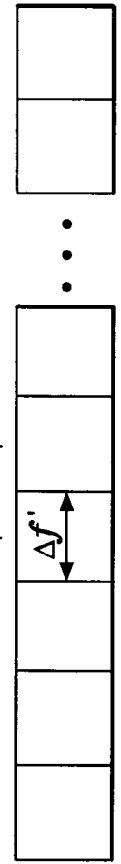

FIGS. 6A-B graphically show two representative DWDM channel configurations that can be used in certain embodiments of OADMs 200, 300, and 500. More specifically, in FIGS. 6A-B, each DWDM channel is represented by a box having a base (e.g., center) frequency $f_i$ and a width $\Delta f$ (FIG. 6A) or $\Delta f'$ (FIG. 6B) corresponding to the bandwidth allocated to that channel, where i is the DWDM channel number. Each of the configurations shown in FIGS. 6A-B utilizes an ITU (International Telecommunication Union) frequency grid, which provides that the base frequencies of two adjacent DWDM channels be separated by a frequency interval of m×50 GHz, where m is a positive integer. In FIG. 6A, m=1, which results in $|f_i-f_{i+1}|$=50 GHz. Similarly, in FIG. 6B, m=2, which results in $|f_i-f_{i+1}|$=100 GHz.

As seen in FIG. 6, each of the shown channel configurations allocates equal bandwidth to each DWDM channel. As such, the configuration of FIG. 6A allocates to each channel a bandwidth of $\Delta f$=50 GHz. Similarly, the configuration of FIG. 6B allocates to each channel a bandwidth of $\Delta f$=100 GHz. A typical prior-art communication system has all DWDM channels with the same uniform bandwidth, e.g., channels with a 50-GHz bandwidth only or, alternatively, channels with a 100-GHz bandwidth only.

Each of the 100-GHz channels of FIG. 6B has a sufficient bandwidth for the transmission of either 10- or 40-Gb/s signals, while each of the 50-GHz channels of FIG. 6A has a sufficient bandwidth for the transmission of 10-Gb/s signals, but not for the transmission of conventional 40-Gb/s signals. More specifically, if used for the transmission of 40-Gb/s signals, the 50-GHz channels of FIG. 6A would, due to their limited bandwidth, cause signal distortions that would render the transmitted signals substantially un-decodable at the receiver. On the other hand, the use of the 100-GHz channels of FIG. 6B for the transmission of 10-Gb/s signals would cause the available spectral resources to be utilized relatively inefficiently.

Alternated Channel Configuration

Figure 7:
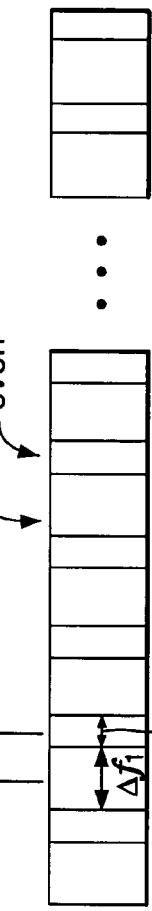
FIG. 7 graphically shows a DWDM channel configuration that can be used in the OADMs of FIGS. 2, 3, and 5.

FIG. 7 graphically shows a DWDM channel configuration that can be used in OADMs 200, 300, and 500 according to one embodiment of the invention. FIG. 7 is analogous to FIG. 6 in the graphical depiction of DWDM channels as frequency boxes. Similar to the configuration of FIG. 6A, the configuration of FIG. 7 corresponds to an ITU frequency grid with m=1. As such, the spacing between the base frequencies of adjacent DWDM channels is about 50 GHz. However, one difference between the configurations of FIGS. 6A and 7 is that the latter allocates unequal bandwidth to different channels. In particular, the configuration of FIG. 7 has two sets of channels, with the channels in one set having a bandwidth of $\Delta f_1$ and the channels in the other set having a bandwidth of $\Delta f_2$, where $\Delta f_1 + \Delta f_2 \approx 100$ GHz. Channels in the two sets are interleaved as shown in FIG. 7 such that each odd channel has a bandwidth of $\Delta f_1$ and each even channel has a bandwidth of $\Delta f_2$. In one embodiment, $\Delta f_1 \approx 2\Delta f_2 \approx 66.7$ GHz. Hereafter, the channel configuration illustrated in FIG. 7 is referred to as an example of an alternated channel configuration.

The alternated channel configuration of FIG. 7 has the same maximum supportable channel density, about 1 channel per 50 GHz, as the configuration of FIG. 6A. However, unlike the latter, the alternated channel configuration is suitable for the transmission of both 10- and 40-Gb/s signals. For example, each of the odd channels of FIG. 7 can be used for the transmission of 40-Gb/s signals, while each of the even channels can be used for the transmission of 10-Gb/s signals. The extra bandwidth allocated to each odd channel compared to that in FIG. 6A is such that the corresponding signal distortions induced due to the bandwidth limitations become acceptable for successfully decoding 40-Gb/s signals at the receiver. Of course, the extra bandwidth is added to odd channels at the expense of even channels. However, the bandwidth reduction in each of the even channels compared to that available in the configuration of FIG. 6A is such that the corresponding signal distortions of 10-Gb/s signals are relatively insignificant and those signals can still be successfully decoded at the receiver. Due to both linear and nonlinear crosstalk concerns (particularly in long-haul transmissions), a populated 40-Gb/s channel may not be adjacent to a populated 10-Gb/s channel in communication systems configured for long-distance transmissions, e.g., greater than about 800 km. While the total number of populated channels may decrease when a 40-Gb/s service is added, the overall system capacity will still increase because the 40-Gb/s channels utilize the available spectral resources with much higher spectral efficiency than that of the 10-Gb/s channels.

In one embodiment, the relative bandwidths of the odd and even channels in the alternated channel configuration are selected such that the penalty on the transmission of 10-Gb/s signals and the improvement in the transmission of 40-Gb/s signals with respect to the configuration of FIG. 6A are balanced to achieve an optimum overall transmission quality. One skilled in the art will appreciate that the alternated channel configuration has certain advantages over the configuration of FIG. 6B because it uses the available spectral resources more efficiently and has a higher spectral density of channels.

OADM 300 (FIG. 3) can be adapted to process optical signals corresponding to the alternated channel configuration of FIG. 7, for example, as follows. The first group of channels, which is routed through the OADM branch coupled between port II of DMUX 312 and port II of MUX 332, includes the even channels of FIG. 7. At the same time, the second group of channels, which is routed through the OADM branch coupled between port III of DMUX 312 and port III of MUX 332, includes the odd channels of FIG. 7.

Similarly, OADM 500 (FIG. 5) can be adapted to process optical signals corresponding to the alternated channel configuration of FIG. 7, for example, as follows. The first group of channels, which is routed between main input port 502, drop port 506*a*, add port 508*a*, and main output port 504 includes the even channels of FIG. 7; and the second group of channels, which is routed between main input port 502, drop port 506*b*, add port 508*b*, and main output port 504 includes the odd channels of FIG. 7. In addition, wavelength blocker 516 needs to be adapted to handle channels of both bandwidths, as discussed in more detail below.

Figure 8:
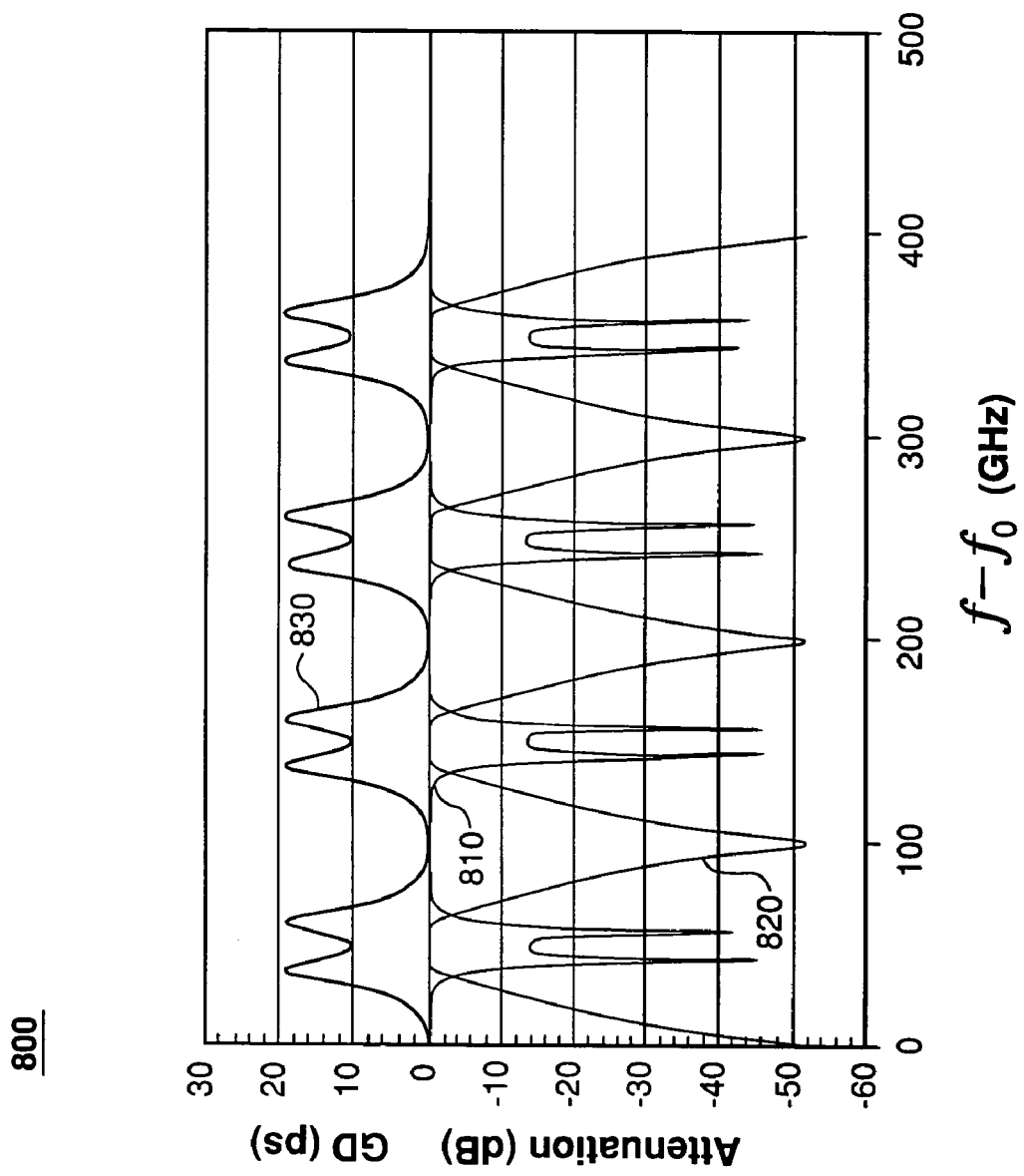
FIG. 8 graphically illustrates properties of an interleaver that can be used in the OADMs of FIGS. 3 and 5.

FIG. 8 graphically illustrates properties of a bi-directional optical interleaver 800 that can be used to implement DMUX 312 and/or MUX 332 in each of OADMs 300 and 500 according to one embodiment of the invention. More specifically, the top and bottom panels in FIG. 8 graphically show the group-delay (GD) and attenuation profiles, respectively, of optical interleaver 800. In one embodiment, curve 810 in FIG. 8 corresponds to light attenuation (i) in DMUX 312 between ports I and III and, also, (ii) in MUX 332 between ports III and I. Similarly, curve 820 in FIG. 8 corresponds to light attenuation (i) in DMUX 312 between ports I and II and, also, (ii) in MUX 332 between ports II and I. As seen in FIG. 8, curve 810 has a plurality of transmission bands each having (i) a base frequency on a 100-GHz grid with grid lines located at 0, 100, 200 GHz, etc. and (ii) a 3-dB bandwidth of about 65 GHz. Transmission ripples located at about 50, 150, 250 GHz, etc. between the transmission bands are primarily due to the interference effects in optical interleaver 800. These transmission ripples are neither substantially beneficial nor substantially detrimental to the operation of the interleaver in an OADM of the invention. Similarly, curve 820 has a plurality of transmission bands each having (i) a base frequency on a 100-GHz grid with grid lines located at 50, 150, 250 GHz, etc. and (ii) a 3-dB bandwidth of about 35 GHz. In one implementation, optical interleaver 800 is fabricated using the planar waveguide technology, the application of which to the fabrication of optical interleavers, multiplexers, and demultiplexers is known in the art and described, for example, in U.S. Pat. Nos. 6,591,038 and 6,560,380, the teachings of both of which are incorporated herein by reference.

FIGS. 9A-B show block diagrams of a DMUX 912 and a MUX 932 that can be used as DMUX 312 and MUX 332, respectively, according to one embodiment of the invention. Briefly referring to the top panel of FIG. 8, curve 830 indicates that the amplitude of peak-to-peak GD ripples in optical interleaver 800 is on the order of 20 ps, i.e., about 80% of the duration of a 40-Gb/s signaling interval. However, it is often desirable to have that amplitude at or below about 50% of the duration of a signaling interval corresponding to the highest bit rate in the system (in the present case, 40 Gb/s). Each of DMUX 912 and MUX 932 addresses this problem by having a pair of dispersion compensators 930a-b coupled to interleaver 800 of FIG. 8. Each of dispersion compensators 930a-b serves to reduce the amplitude of peak-to-peak GD ripples down to a desired level. In DMUX 912, dispersion compensators 930a-b are configured to compensate for the group delay already induced in optical interleaver 800, which is located upstream from the compensators. On the other hand, in MUX 932, dispersion compensators 930a-b are configured to pre-compensate for the group delay that will be induced in optical interleaver 800, which is located downstream from the compensator. In one embodiment, each of dispersion compensators 930a-b is a compensator disclosed in commonly owned U.S. Pat. No. 6,631,246, the teachings of which are incorporated herein by reference.

Briefly referring back to FIGS. 3 and 4, wavelength blocker 416 (FIG. 4) can be designed to implement wavelength blocker 316 (FIG. 3) for the alternated channel configuration in a relatively straightforward fashion. Namely, when wavelength blocker 416 implements wavelength blocker 316a, the array of rotatable MEMS mirrors in switch 430 has gaps between adjacent mirrors, with each gap centered at about the wavelength of the corresponding even channel. Similarly, when wavelength blocker 416 implements wavelength blocker 316b, the array of rotatable MEMS mirrors in switch 430 has gaps between adjacent mirrors with each gap centered at about the wavelength of the corresponding odd channel.

Now referring back to FIGS. 4 and 5, wavelength blocker 416 (FIG. 4) can be designed to implement wavelength blocker 516 (FIG. 5) as follows. The array of rotatable MEMS mirrors in switch 430 has mirrors of two different widths. More specifically, the relative mirror widths in switch 430 correspond to the relative DWDM channel bandwidths. For example, a relatively wide mirror corresponding to an odd DWDM channel is followed by a relatively narrow mirror corresponding to an even DWDM channel, which is followed by a next relatively wide mirror corresponding to an odd DWDM channel, etc.

Communication system 100 (FIG. 1) employing the alternated channel configuration can increase its capacity by, e.g., replacing the transmission of 10-Gb/s signals in some odd bands of FIG. 7 with the transmission of 40-Gb/s signals, while leaving the transmission of 10-Gb/s signals in some even bands of FIG. 7 substantially undisrupted. A corresponding system upgrade includes upgrading only the system components coupled to drop ports 306b and 506b and add ports 308b and 508b of OADMs 300 and 500, respectively. At the same time, the system components coupled to drop ports 306a and 506a and add ports 308a and 508a of OADMs 300 and 500, respectively, remain substantially unchanged. One skilled in the art will understand that this upgrade achieves a desired purpose of adding a 40-Gb/s service while minimizing disruptions to the 10-Gb/s service already in place. Other beneficial options might be available to the operator of communication system 100 if, at the time of the upgrade, the system did not operate at full capacity. For example, if only odd channels were occupied with the transmission of 10-Gb/s signals while the even channels were vacant, the 10-Gb/s signals can be rolled over into the even channels. Then, the freed odd channels can be populated with new 40-Gb/s services.

FIGS. 10A-B graphically illustrate two possible DWDM channel-population schemes in communication system 100 (FIG. 1), which employs an alternated channel configuration having 64 odd channels and 64 even channels, for the total of 128 channels. Referring to FIG. 10A, in one embodiment, communication system 100 (FIG. 1) employing, in each node 102, an OADM analogous to OADM 300 (FIG. 3) can increase its capacity by (1) starting with the transmission of 10-Gb/s signals, (2) at some point, adding the transmission of 40-Gb/s signals, and (3) then increasing the number of 10-Gb/s signals. Suppose that, when such system 100 is deployed, it utilizes 32 even DWDM channels in the first 64 channels for the transmission of 10-Gb/s signals while the remaining channels are vacant. In FIG. 10A, these initially utilized (populated) channels are labeled with the letter "α". In this initial configuration, each OADM uses only one branch (e.g., including ports analogous to drop port 306a and add port 308 a) while the other branch (e.g., including ports analogous to drop port 306b and add port 308b) remains substantially unutilized.

In an upgrade, an operator of system 100, e.g., a telephone company, may increase the system capacity by populating 32 odd DWDM channels in the second 64 channels with the transmission of 40-Gb/s signals. In FIG. 10A, these additionally populated channels are labeled with the letter "β". With the α-and β-channels populated, each OADM uses both of its optical branches.

During a next upgrade, the operator of system 100 may increase the system capacity even further by populating the 32 remaining odd DWDM channels in the first 64 channels with the transmission of 10-Gb/s signals. In FIG. 10A, the channels populated during this upgrade are labeled with the letter "γ". With the γ-channels populated, each OADM reaches a capacity of 64 10-Gb/s channels and 32 40-Gb/s channels, for a total of 96 populated channels.

During yet another upgrade, the operator of system 100 may increase the system capacity still further by populating the remaining unpopulated DWDM channels with the transmission of 10-Gb/s signals. In FIG. 10A, these additionally populated channels are labeled with the letter "δ". It is preferred that these newly added 10-Gb/s signals employ a differential phase-shift keying (DPSK) modulation format to reduce the nonlinear crosstalk between adjacent channels. With the δ-channels populated, each OADM reaches a capacity of 96 10-Gb/s channels and 32 40-Gb/s channels, for a total of 128 populated channels (with 50-GHz channel spacing). Alternatively, the δ-channels can be populated with 40-Gb/s signals when bandwidth-efficient modulation formats, such as optical duobinary or differential-quadrature phase-shift keying (DQPSK) are used. Further, it should be understood that other bandwidth-efficient signals (e.g., 80-Gb/s DQPSK signals) can also be used to populate various channels of FIG. 10A.

An upgrade scheme similar to that just described in the context of FIG. 10A is shown in FIG. 10B. Accordingly, the α-, β-, γ-, and δ-channels shown in FIG. 10B correspond to the upgrade stages analogous to those which populated the similarly labeled channels in FIG. 10A. However, an important difference between the schemes of FIGS. 10A and 10B is in the distribution of channels with different data rates (and modulation formats), the number of populated channels of each type after each upgrade and, therefore, in the realized system capacity. This difference can readily be discerned in the table, which follows.

TABLE 1

Number of Populated Channels in the Course of System Upgrades

| Upgrade Stage | FIG. 10A | | | FIG. 10B | | |
|---|---|---|---|---|---|---|
| | Even | Odd | Total | Even | Odd | Total |
| α | 32 | — | 32 | 48 | — | 48 |
| α + β | 32 | 32 | 64 | 48 | 16 | 64 |
| α + β + γ | 32 | 64 | 96 | 48 | 64 | 112 |
| α + β + γ + δ | 64 | 64 | 128 | 64 | 64 | 128 |

One skilled in the art will appreciate that, by appropriately selecting the initial number of α- and β-channels, the operator of system 100 can step through different desired values of the system capacity in the course of upgrades.

Banded Channel Configuration

Figure 11A:
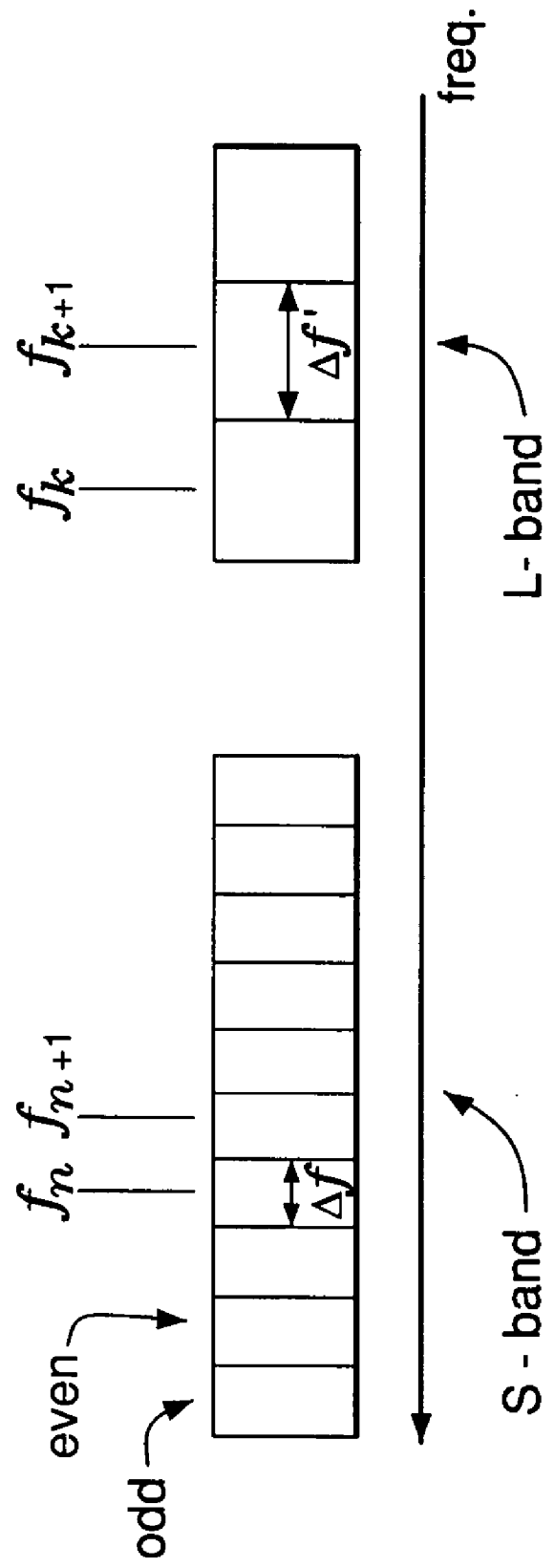
FIG. 11A graphically shows a DWDM channel configuration that can be used in the OADMs of FIGS. 2, 3, and 5.

FIG. 11A graphically shows a DWDM channel configuration that can be in OADMs 200, 300, and 500 according to one embodiment of the invention. FIG. 11A is analogous to FIGS. 6 and 7 in the graphical depiction of DWDM channels. Similar to the alternated channel configuration of FIG. 7, the configuration of FIG. 11A has two sets of channels, wherein the channels in one set have a bandwidth of Δf and the channels in the other set have a bandwidth of Δf' different from Δf. However, channels in the two sets are not interleaved as in FIG. 7, but instead, are bundled into two separate spectral bands labeled as "S-band" and "L-band", respectively. The S-band corresponds to m=1, which results in $|f_n - f_{n+1}| \approx 50$ GHz, where n is a DWDM channel number in the S-band, and has channels with a bandwidth of Δf 50 GHz. The L-band corresponds to m=2, which results in $|f_k - f_{k+1}| \approx 100$ GHz, where k is a DWDM channel number in the L-band, and has channels with a bandwidth of Δf'≈100 GHz. As such, the configuration of FIG. 11A has non-uniform spectral density of channels across its full spectral range, i.e., 1 channel per about 50 GHz in the S-band and 1 channel per about 100 GHz in the L-band. In one embodiment, the S- and L-bands correspond to different amplification bands of an erbium-doped fiber amplifier (EDFA). Hereafter, the channel configuration illustrated in FIG. 11A is referred to as an example of a banded channel configuration. Note that a guard spectral band may need to be present between the S-band and L-band to avoid band-edge distortions.

Similar to the alternated channel configuration of FIG. 7, the banded channel configuration of FIG. 11A is suitable for the transmission of both 10- and 40-Gb/s signals. For example, each of the channels in the L-band can be used for the transmission 40-Gb/s signals, while each of the channels in the S-band can be used for the transmission 10-Gb/s signals. While having a slightly lower total achievable capacity than the alternated channel configuration, the banded channel configuration enables a simultaneous existence in the system of 10-Gb/s and 40-Gb/s channels with good individual performances. In addition, the bandwidth allocations for the 10-Gb/s and 40-Gb/s channels can be flexible or adjustable, as shown in more detail below.

Figure 11B:
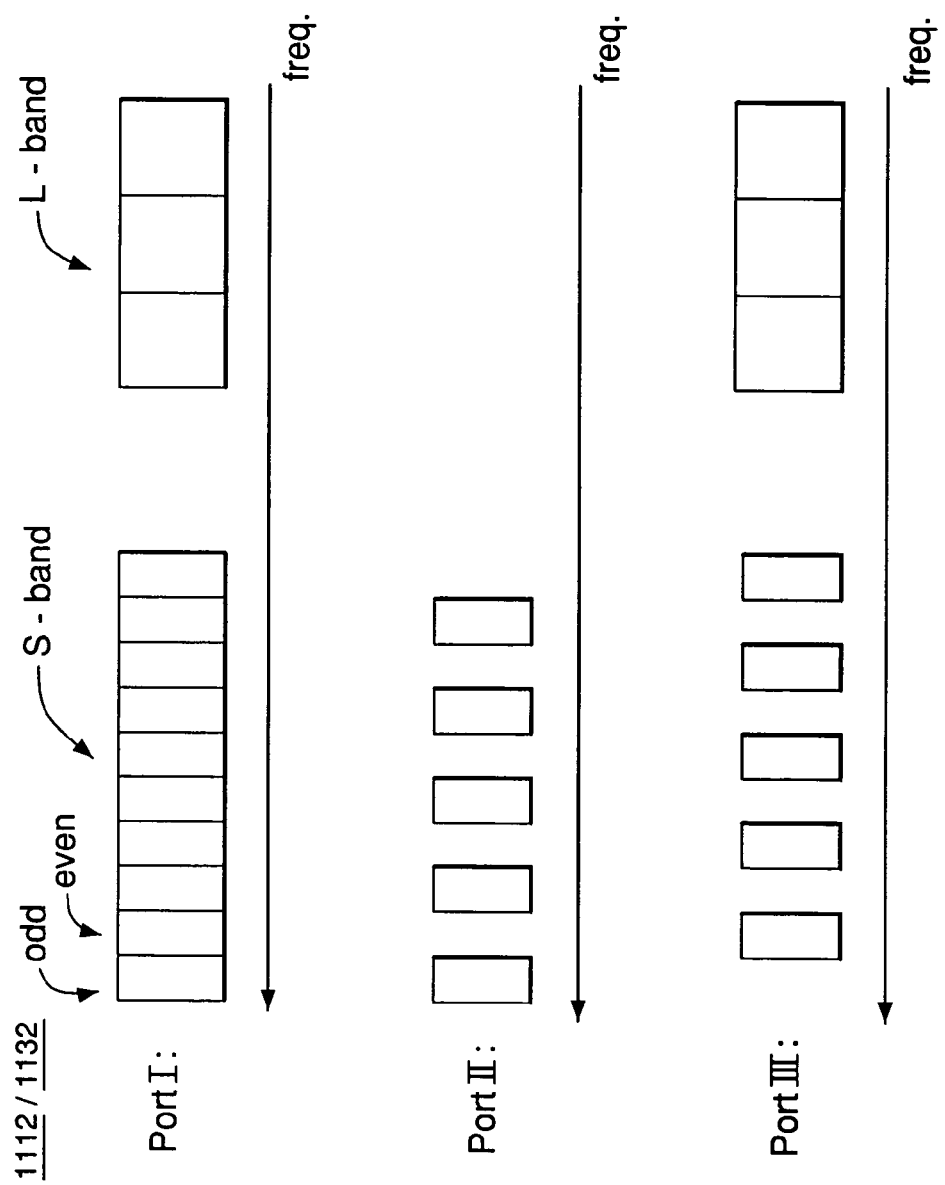
FIG. 11B illustrates properties of another DMUX and another MUX that can be used in the OADM of FIGS. 3 and 5.

FIG. 11B illustrates properties of a DMUX 1112 that can be used as DMUX 312 according to one embodiment of the invention. DMUX 1112 has three ports (labeled I, II, and III), which are analogous to the similarly labeled ports of DMUX 312. FIG. 11B, which is analogous to FIG. 11A in the graphical depiction of DWDM channels, graphically illustrates a channel-routing scheme implemented in DMUX 1112. More specifically, optical signals corresponding to odd DWDM channels of the S-band are routed from port I to port II, optical signals corresponding to even DWDM channels of the S-band are routed from port I to port III, and optical signals corresponding to all DWDM channels of the L-band are routed from port I to port III.

In addition to illustrating properties of DMUX 1112, FIG. 11B also illustrates properties of a MUX 1132 that can be used as MUX 332 according to one embodiment of the present invention. MUX 1132 has three ports (labeled I, II, and III), which are analogous to the similarly labeled ports of MUX 332. The channel-routing scheme implemented in MUX 1132 is as follows. Optical signals corresponding to odd DWDM channels of the S-band are routed from port II to port I, optical signals corresponding to even DWDM channels of the S-band are routed from port III to port I, and optical signals corresponding to all DWDM channels of the L-band are routed from port III to port I.

An OADM analogous to OADM 300 (FIG. 3) and having DMUX 1112 and MUX 1132 of FIG. 11B in place of DMUX 312 and MUX 332, respectively, is adapted to process optical signals corresponding to the banded channel configuration of FIG. 11A as follows. The first group of channels, which is routed through the OADM branch coupled between port II of DMUX 1112 and port II of MUX 1132, includes odd DWDM channels of the S-band of FIG. 11A. The second group of channels, which is routed through the OADM branch coupled between port III of DMUX 1112 and port III of MUX 1132, includes even DWDM channels of the S-band and all DWDM channels of the L-band of FIG. 11A. Similarly, an OADM analogous to OADM 500 (FIG. 5) and having DMUX 1112 and MUX 1132 of FIG. 11B in place of DMUX 312 and MUX 332, respectively, is adapted to process optical signals corresponding to the banded channel configuration of FIG. 11A as follows. The first group of channels, which is routed between main input port 502, drop port 506a, add port 508a, and main output port 504 includes odd DWDM channels of the S-band of FIG. 11A. Similarly, the second group of channels, which is routed between main input port 502, drop port 506b, add port 508b, and main output port 504 includes even DWDM channels of the S-band and all DWDM channels of the L-band of FIG. 11A.

Figure 12:
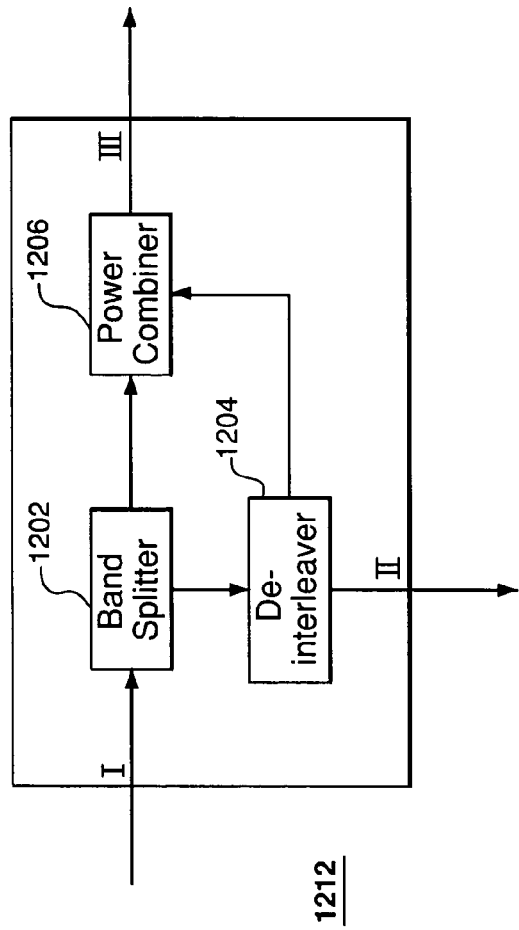
FIG. 12 shows a block diagram of a DMUX that can be used to implement the DMUX illustrated in FIG. 11B.

FIG. 12 shows a block diagram of a DMUX 1212 that can be used to implement DMUX 1112 illustrated in FIG. 11B according to one embodiment of the invention. DMUX 1212 routes optical signals as follows. An optical signal applied to port I is directed to a band splitter 1202 having a characteristic wavelength (or characteristic frequency $f_C$). Band splitter 1202 serves to separate light having wavelengths shorter and longer than the characteristic wavelength into two different beams and direct one beam toward a de-interleaver 1204 and the other beam toward a power combiner 1206. Band splitter 1202 can, for example, be implemented using a glass plate oriented at 45 degrees with respect to the light propagation direction and having a dielectric coating, which transmits light with wavelengths longer than the characteristic wavelength and reflects light with wavelengths shorter than the characteristic wavelength. The characteristic wavelength is preferably such that the corresponding characteristic frequency is located between the S- and L-bands (see FIGS. 11A and 11B). As a result, optical signals corresponding to the S-band are reflected toward de-interleaver 1204 while optical signals corresponding to the L-band are transmitted toward power combiner 1206. In one embodiment, band splitter 1202 is a tunable element, which allows one to change the characteristic wavelength/frequency. The tuning can, for example, be accomplished by changing the orientation angle of the glass plate or changing its temperature. This feature enables flexible and/or adjustable bandwidth allocation for the S- and L-bands, which enables selection of a desired relative quantity of 10- and 40-Gb/s channels in the system.

De-interleaver 1204 is adapted to sort optical signals based on wavelength or DWDM channel number. For example, optical signals corresponding to odd DWDM channels of the S-band are directed toward port II while optical signals corresponding to even DWDM channels of the S-band are directed toward power combiner 1206. De-interleavers similar to de-interleaver 1204 are well known in the art and are disclosed, for example, in U.S. Pat. No. 6,560,380, the teachings of which are incorporated herein by reference. Power combiner 1206 is analogous to, e.g., power combiner 334 of FIG. 3. As such, it combines the signals received from band splitter 1202 and de-interleaver 1204 and directs the combined signal to port III.

Figure 13:
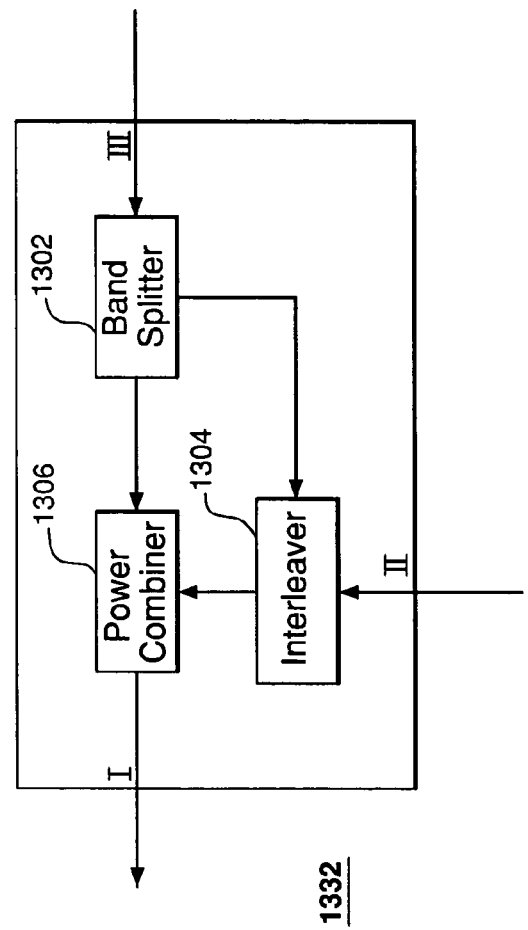
FIG. 13 shows a block diagram of a MUX that can be used to implement the MUX illustrated in FIG. 11B.

FIG. 13 shows a block diagram of a MUX 1332 that can be used to implement MUX 1132 illustrated in FIG. 11B according to one embodiment of the invention. MUX 1332 routes optical signals as follows. An optical signal applied to port III is directed to a band splitter 1302, which serves to separate light corresponding to the S- and L-bands into two different beams. More specifically, optical signals corresponding to the S-band are directed toward an interleaver 1304 while optical signals corresponding to the L-band are directed toward a band combiner 1306. In one embodiment, band splitter 1302 is similar to band splitter 1202 of FIG. 12. Interleaver 1304 is adapted to essentially perform a reverse function of that performed by de-interleaver 1204. More specifically, interleaver 1304 multiplexes the optical signals received from port II and band splitter 1302 and directs the multiplexed signal to a power combiner 1306. In one embodiment, power combiner 1306 is analogous to, e.g., power combiner 334 of FIG. 3. As such, it combines the signals received from band splitter 1302 and interleaver 1304 and directs the combined signal to port I.

In one embodiment, each of DMUX 1212 and MUX 1332 can be implemented using different instances of the same bi-directional optical assembly. For example, an optical assembly having a first bi-directional optical element analogous to band splitter 1202, a second bi-directional optical element analogous to band splitter 1202, and a bi-directional optical interleaver in place of, e.g., band splitter 1202, power combiner 1206, and de-interleaver 1204 (FIG. 2), respectively, can serve, depending on the light propagation direction, as either DMUX 1212 or MUX 1332.

Referring back to FIGS. 3-4 and 11A-11B, wavelength blocker 416 (FIG. 4) can be designed to implement wavelength blocker 316a (FIG. 3) for the banded channel configuration in a relatively straightforward fashion. Namely, when wavelength blocker 416 implements wavelength blocker 316a, the array of rotatable MEMS mirrors in switch 430 has mirrors corresponding to odd DWDM channels of the S-band of FIG. 11A. This wavelength blocker has gaps between adjacent mirrors, each of which gaps is centered at about the wavelength of the corresponding even channel of the S-band. Wavelength blocker 416 can be designed to implement wavelength blocker 316b, for example, as follows. The array of rotatable MEMS mirrors in switch 430 has two groups of mirrors. More specifically, the first group has mirrors corresponding to even DWDM channels of the S-band, and the second group has mirrors corresponding to DWDM channels of the L-band. As such, mirrors in the first group are narrower than mirrors in the second group. In addition, mirrors in the first group have gaps between adjacent mirrors, each of which gaps is centered at about the wavelength of the corresponding odd channel of the S-band.

Now referring back to FIGS. 3, 5 and 11A-11B, wavelength blocker 416 (FIG. 4) can be designed to implement wavelength blocker 516 (FIG. 5) for the banded channel configuration as follows. The array of rotatable MEMS mirrors in switch 430 has two groups of mirrors. More specifically, the first group has mirrors corresponding to (both odd and even) DWDM channels of the S-band, and the second group has mirrors corresponding to DWDM channels of the L-band. As such, mirrors in the first group are narrower than mirrors in the second group. In addition, mirrors in the first and second groups have relatively narrow gaps between adjacent mirrors to accommodate all channels of the S- and L-bands, respectively.

Figure 14A:
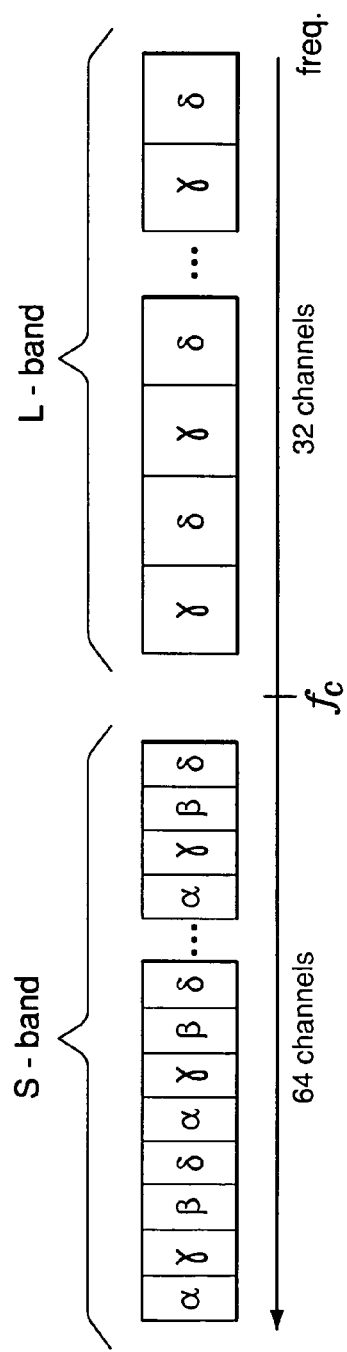
FIGS. 14A-B graphically illustrate channel-population schemes for the DWDM channel configuration of FIG. 11A.
Figure 14B:
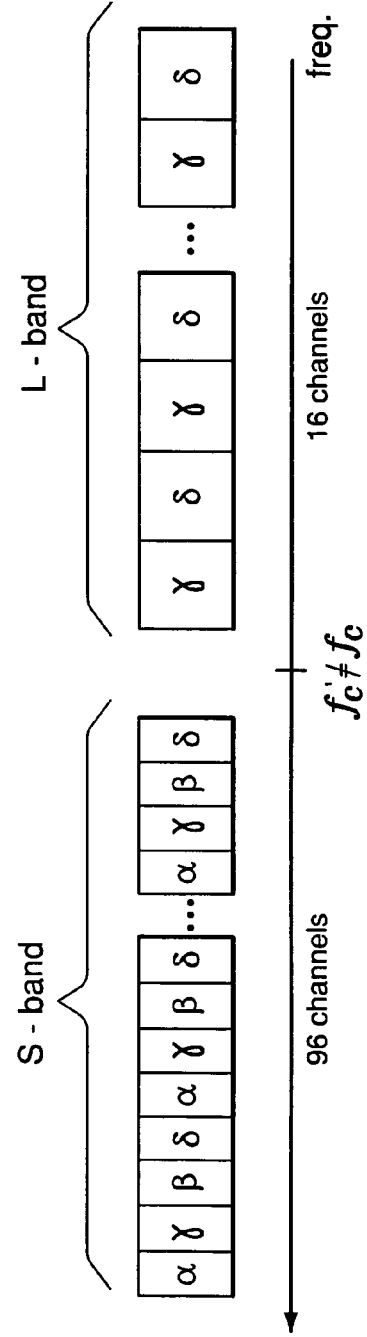

FIGS. 14A-B graphically illustrate two DWDM channel-population schemes in communication system 100 (FIG. 1), which employs the banded channel configuration. More specifically, FIG. 14A shows a situation in which (i) the total bandwidth allocated to the S-band is substantially equal to the total bandwidth allocated to the L-band and (ii) the S- and L-bands accommodate 64 and 32 DWDM channels, respectively. Similarly, FIG. 14B shows a situation in which (i) the total bandwidth allocated to the S-band is substantially three times larger than the total bandwidth allocated to the L-band and (ii) the S- and L-bands accommodate 96 and 16 DWDM channels, respectively.

Referring to FIG. 14A, in one embodiment, communication system 100 (FIG. 1) employing, in each node 102, an OADM analogous to OADM 300 (FIG. 3), which OADM has DMUX 1212 (FIG. 12) and MUX 1332 (FIG. 13), can increase its capacity by (1) increasing the number of transmitted 10-Gb/s signals and (2) at some point, adding the transmission of 40-Gb/s signals and then increasing their number as well. Suppose that, when such system 100 is deployed, it utilizes 16 DWDM channels in the S-band for the transmission of 10-Gb/s signals while the remaining channels in the S-band and all channels in the L-band are vacant. In FIG. 14A, these initially utilized (populated) channels are labeled with the letter "α". One skilled in the art will appreciate that a preferred spacing between the base frequencies of adjacent α-channels is about 200 GHz. In this initial configuration, each OADM uses only one branch (e.g., including ports analogous to drop port 306a and add port 308a) while the other branch (e.g., including ports analogous to drop port 306b and add port 308b) remains substantially unutilized (also see FIGS. 11A-11B).

In an upgrade, an operator of system 100, e.g., a telephone company, may increase the system capacity by populating 16 additional DWDM channels in the S-band for the transmission of additional 10-Gb/s signals. In FIG. 14A, these additionally populated channels are labeled with the letter "β". One skilled in the art will appreciate that a preferred spacing between the base frequencies of adjacent β-and α-channels is about 100 GHz. With the α-and β-channels populated, each OADM reaches the full capacity of its one branch because all odd channels of the S-band are now populated. The other branch in each OADM still remains unutilized after this upgrade.

Several options are available for a next upgrade of system 100, during which resources corresponding to the unutilized branch in each OADM will be used. For example, the operator of system 100 may further increase the system capacity by populating 16 additional DWDM channels in the S-band and 16 DWDM channels in the L-band. In FIG. 14A, the channels populated during this upgrade are labeled with the letter "γ". While γ-channels in the S-band are employed for the transmission of 10-Gb/s signals, γ-channels in the L-band can be employed for the transmission of 40-Gb/s signals. One skilled in the art will understand that this upgrade can achieve a desired purpose of adding a 40-Gb/s service without disrupting the 10-Gb/s service already in place. In addition, the current traffic volume of the 10-Gb/s service is increased.

During yet another upgrade, the operator of system 100 may increase the system capacity even further by populating the 16 remaining DWDM channels in the S-band and the 16 remaining DWDM channels in the L-band. In FIG. 14A, the channels populated during this upgrade are labeled with the letter "δ". With the δ-channels populated, each OADM reaches its full capacity of 64 10-Gb/s channels and 32 40-Gb/s channels, for a total of 96 channels.

An upgrade scheme similar to that just described in the context of FIG. 14A may also be implemented for the S- and L-bands of FIG. 14B. Accordingly, the α-, β-, γ-, and δ-channels shown in FIG. 14B correspond to the upgrade stages analogous to those which populated the similarly labeled channels in FIG. 14A. However, an important difference between the schemes of FIGS. 14A and 14B is in the number of populated channels of each type after each upgrade and, therefore, in the realized system capacity. This difference can readily be discerned in the table, which follows.

TABLE 2

| Upgrade Stage | Number of Populated Channels in the Course of System Upgrades | | | | | |
|---|---|---|---|---|---|---|
| | FIG. 14A | | | FIG. 14B | | |
| | S-band | L-band | Total | S-band | L-band | Total |
| α | 16 | — | 16 | 24 | — | 24 |
| α + β | 32 | — | 32 | 48 | — | 48 |
| α + β + γ | 48 | 16 | 64 | 72 | 8 | 80 |
| α + β + γ + δ | 64 | 32 | 96 | 96 | 16 | 112 |

One skilled in the art will appreciate that, by appropriately selecting the characteristic frequency ($f_C$) between the S- and L-bands (see FIGS. 14A-B), the operator of system 100 can step through different desired values of the system capacity in the course of upgrades.

While this invention has been described with reference to illustrative embodiments, this description is not intended to be construed in a limiting sense. For example, a hybrid DWDM channel configuration may be realized by having channels similar to those of the alternated channel configuration of FIG. 7 in the S-band of the banded channel configuration of FIG. 11A. In such a hybrid channel configuration, there are three sets of channels having three different bandwidth values, e.g., about 33, 67, and 100 GHz, respectively. The channels of the first and second sets are interleaved with each other and occupy the S-band, and the channels of the third set occupy the L-band. Each of the OADM topologies shown in FIGS. 3 and 5 can be used to implement an OADM for said hybrid DWDM channel configuration. Different designs of wavelength blockers can be used without departing from the scope and principles of the invention. For example, in wavelength blocker 416 (FIG. 4), switch 430 and signal dump 440 can be replaced with an array of fixed mirrors and a segmented LC (liquid-crystal) mask positioned between grating 420 and that array of fixed mirrors. Each segment of the LC mask can then be turned on or off to block or pass, respectively, light traveling between the grating and the fixed mirror corresponding to the segment. Different DWDM channel-population schemes can be implemented without departing from the principles of the invention. Although multiplexers and de-multiplexers of the invention have been described in the context of their use in OADMs, one skilled in the art will understand that these multiplexers and de-multiplexers can also be used in other optical routing devices. OADMs of the invention can be designed to process more than two sets of channels. Consequently, each of such OADMs has a corresponding number of branches, each adapted to process DWDM channels of the corresponding set of channels. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. An optical apparatus, comprising a plurality of ports having first, second, and third ports, which apparatus is adapted to route optical signals between different ports based on wavelength, wherein:

the optical signals correspond to two or more sets of channels, each set having one or more channels with a corresponding bandwidth value;

at least two different sets of channels have different bandwidth values; and the optical apparatus comprises a routing device adapted to:

route optical signals corresponding to a first group of channels between the first port and the second port;

route optical signals corresponding to a second group of channels between the first port and the third port;

the first group of channels is a first subset of a first set of channels;

the second group of channels includes a second set of channels and a second subset of the first set of channels;

channels from the first set occupy a first spectral band, wherein channels from the first subset are interleaved with channels from the second subset;

channels from the second set occupy a second spectral band distinct from the first spectral band; and the routing device comprises:

a band splitter coupled to the first port and adapted to divide an optical beam applied to the first port into first and second beams, wherein the first beam corresponds to the first spectral band and the second beam corresponds to the second spectral band;

a de-interleaver adapted to receive the first optical beam and divide said beam into first and second sub-beams, wherein (i) the first sub-beam corresponds to the first subset and is directed to the second port and (ii) the second sub-beam corresponds to the second subset and is directed to a combiner; and the combiner adapted to combine the second sub-beam with the second beam and direct the combined beam to the third port.

2. The apparatus of claim 1, wherein the routing device is configured as a multiplexer (MUX).

3. The apparatus of claim 1, wherein the routing device is configured as a de-multiplexer (DMUX).

4. The apparatus of claim 1, wherein:
the two or more sets of channels include the first and second sets of channels;
each channel in the first set has a first bandwidth value; and
each channel in the second set has a second bandwidth value.

5. The apparatus of claim 4, wherein:
the channels of the first set occupy a first spectral band; and
the channels of the second set occupy a second spectral band.

6. The apparatus of claim 5, wherein the first and second spectral bands are continuous bands distinct from each other.

7. The apparatus of claim 5, wherein:
base frequencies of two adjacent channels in the first spectral band are separated by about 50 GHz; and
base frequencies of two adjacent channels in the second spectral band are separated by about 100 GHz.

8. The apparatus of claim 1, wherein:
the two or more sets of channels include the first and second sets of channels and a third set of channels;
each channel in the first set has a first bandwidth value;
each channel in the second set has a second bandwidth value;
each channel in the third set has a third bandwidth value;
the channels of the first and second sets occupy a first spectral band;
the channels of the third set occupy a second spectral band; and
the first and second spectral bands are continuous bands distinct from each other.

9. The apparatus of claim 8, wherein the channels of the first set are interleaved with the channels of the second set.

10. The apparatus of claim 1, wherein the band splitter is a tunable device adapted to change a boundary between the first and second spectral bands.

11. The apparatus of claim 1, wherein the optical apparatus comprises an optical add/drop multiplexer (OADM) and the routing device is a part of said OADM.

12. The apparatus of claim 11, wherein the OADM comprises first and second optical branches, both coupled between a DMUX and a MUX, wherein:
the DMUX is coupled to a main input port and adapted to route (i) optical signals corresponding to the first group of channels via the first optical branch and (ii) optical signals corresponding to the second group of channels via the second optical branch; and
the MUX is coupled to a main output port and adapted to route optical signals received via the first and second optical branches to said main output port.

13. The apparatus of claim 12, wherein each optical branch includes a wavelength blocker adapted to block one or more selected channels belonging to a corresponding group of channels.

14. The apparatus of claim 13, wherein each optical branch further includes:
a splitter coupled between the DMUX and the wavelength blocker, wherein the splitter is adapted to (i) split a signal received from the DMUX into first and second split signals and (ii) direct the first slit signal to the wavelength blocker and the second split signal to a drop port; and
a combiner coupled between the wavelength blocker and the MUX, wherein the combiner is adapted to (i) combine signals received from the wavelength blocker and an add port and (ii) direct the combined signal to the MUX.

15. The invention apparatus of claim 11, wherein the OADM comprises:
a wavelength blocker coupled between a main input port and a main output port and adapted to block one or more selected channels;
a signal splitter coupled between the main input port and the wavelength blocker and adapted to direct signals received from the main input port to the wavelength blocker and a DMUX;
the DMUX coupled the signal splitter and adapted to direct (i) optical signals corresponding to the first group of channels to a first drop port and (ii) optical signals corresponding to the second group of channels to a second drop port;
a signal combiner coupled between the wavelength blocker and the main output port and adapted to combine signals received from the wavelength blocker and a MUX and direct the combine signal to the main output port; and
the MUX adapted to direct optical signals applied to first and second add ports to the signal combiner.

16. The apparatus of claim 11, wherein the OADM is a part of a node in a communication network.

17. A method of transmitting optical signals, comprising:
routing optical signals corresponding to a first group of channels between a first port and a second port of an optical routing device; and
routing optical signals corresponding to a second group of channels between the first port and a third port of said optical routing device, wherein:
the optical signals correspond to two or more sets of channels, each set having one or more channels with a corresponding bandwidth value;
at least two different sets of channels have different bandwidth values;
the first group of channels is a first subset of a first set of channels;
the second group of channels includes a second set of channels and a second subset of the first set of channels;
channels from the first set occupy a first spectral band, wherein channels from the first subset are interleaved with channels from the second subset;
channels from the second set occupy a second spectral band distinct from the first spectral band; and
the routing device comprises:
a band splitter coupled to the first port and adapted to divide an optical beam applied to the first port into first and second beams, wherein the first beam corresponds to the first spectral band and the second beam corresponds to the second spectral band;

a de-interleaver adapted to receive the first optical beam and divide said beam into first and second sub-beams, wherein (i) the first sub-beam corresponds to the first subset and is directed to the second port and (ii) the second sub-beam corresponds to the second subset and is directed to a combiner; and the combiner adapted to combine the second sub-beam with the second beam and direct the combined beam to the third port.

18. The method of claim 17, wherein the routing device is configured as a multiplexer (MUX).

19. The method of claim 17, wherein the routing device is configured as a de-multiplexer (DMUX).

20. The method of claim 17, wherein:
the two or more sets of channels include the first and second sets of channels;
each channel in the first set has a first bandwidth value; and
each channel in the second set has a second bandwidth value.

21. The method of claim 20, wherein:
the channels of the first set occupy a first spectral band; and
the channels of the second set occupy a second spectral band.

22. The method of claim 21, wherein the first and second spectral bands are continuous bands distinct from each other.

23. The method of claim 17, wherein:
the two or more sets of channels include the first and second sets of channels and a third set of channels;
each channel in the first set has a first bandwidth value;
each channel in the second set has a second bandwidth value;
each channel in the third set has a third bandwidth value;
the channels of the first and second sets occupy a first spectral band;
the channels of the third set occupy a second spectral band; and
the first and second spectral bands are continuous bands distinct from each other.

24. The method of claim 23, wherein the channels of the first set are interleaved with the channels of the second set.

25. The method of claim 17, wherein:
the first group of channels is a first subset of the first set of channels; and
the second group of channels includes the second set of channels and a second subset of the first set of channels.

26. The method of claim 25, wherein channels from the first set occupy a first spectral band, wherein channels from the first subset are interleaved with channels from the second subset.

27. The method of claim 26, wherein channels from the second set occupy a second spectral band distinct from the first spectral band.

28. The method of claim 17, wherein the routing device is a part of an optical add/drop multiplexer (OADM).

29. An optical apparatus, comprising a plurality of ports having first, second, and third ports, which apparatus is adapted to route optical signals between different ports based on wavelength, wherein:
the optical signals correspond to two or more sets of channels, each set having one or more channels with a corresponding bandwidth value;
at least two different sets of channels have different bandwidth values; and
the optical apparatus comprises a routing device adapted to:
route optical signals corresponding to a first group of channels between the first port and the second port; and
route optical signals corresponding to a second group of channels between the first port and the third port;
the first group of channels is a first subset of the first set of channels;
the second group of channels includes the second set of channels and a second subset of the first set of channels;
channels from the first set occupy a first spectral band, wherein channels from the first subset are interleaved with channels from the second subset;
channels from the second set occupy a second spectral band distinct from the first spectral band; and
the routing device comprises:
a band splitter coupled to the third port and adapted to divide an optical beam applied to the third port into first and second sub-beams, wherein the first sub-beam corresponds to the first spectral band and the second sub-beam corresponds to the second spectral band;
an interleaver adapted to receive the first sub-beam, combine said sub-beam with an optical beam applied to the second port, and direct the combined beam to a combiner; and
the combiner adapted to further combine the combined beam with the second beam and direct the resulting beam to the first port.

30. The apparatus of claim 29, wherein:
the optical beam applied to the second port has optical signals corresponding to the first group of channels; and
the optical beam applied to the third port has optical signals corresponding to the second group of channels.

31. The apparatus of claim 29, wherein the band splitter is a tunable device adapted to change a boundary between the first and second spectral bands.

32. A method of transmitting optical signals, comprising:
routing optical signals corresponding to a first group of channels between a first port and a second port of an optical routing device; and
routing optical signals corresponding to a second group of channels between the first port and a third port of said optical routing device, wherein:
the optical signals correspond to two or more sets of channels, each set having one or more channels with a corresponding bandwidth value;
at least two different sets of channels have different bandwidth values;
the first group of channels is a first subset of a first set of channels;
the second group of channels includes a second set of channels and a second subset of the first set of channels;
channels from the first set occupy a first spectral band, wherein channels from the first subset are interleaved with channels from the second subset;
channels from the second set occupy a second spectral band distinct from the first spectral band; and
the routing device comprises:
a band splitter coupled to the third port and adapted to divide an optical beam applied to the third port into first and second sub-beams, wherein the first sub-beam corresponds to the first spectral band and the second sub-beam corresponds to the second spectral band;

an interleaver adapted to receive the first sub-beam, combine said sub-beam with an optical beam applied to the second port, and direct the combined beam to a combiner; and the combiner adapted to further combine the combined beam with the second beam and direct the resulting beam to the first port.

33. The method of claim 32, wherein:

the optical beam applied to the second port has optical signals corresponding to the first group of channels; and the optical beam applied to the third port has optical signals corresponding to the second group of channels.

34. The method of claim 32, wherein the band splitter is a tunable device adapted to change a boundary between the first and second spectral bands.

* * * * *